United States Patent

[11] 3,561,577

[72] Inventor Richard Binder
Schweinfurt am Main, Germany
[21] Appl. No. 807,174
[22] Filed Mar. 14, 1969
[45] Patented Feb. 9, 1971
[73] Assignee Fichtel & Sachs AG
Schweinfurt am Main, Germany
[32] Priority Mar. 23, 1968
[33] Germany
[31] P 17 55 032.2

[54] MULTIPLE DISC CLUTCH WITH AUTOMATIC WEAR ADJUSTER
10 Claims, 7 Drawing Figs.

[52] U.S. Cl. ............................................. 192/111,
192/70.28; 188/196, 188/67
[51] Int. Cl. ................................................ F16d 13/75
[50] Field of Search ................................. 192/111A,
70.25, 70.28, 70.29; 188/196P

[56] References Cited
UNITED STATES PATENTS
2,349,132 5/1944 Baird .......................... 192/111A
3,056,472 10/1962 Bessler et al. ................. 188/196PX
3,297,122 1/1967 Simonson ..................... 192/111A
FOREIGN PATENTS
64,688 6/1955 France ......................... 192/70.29

Primary Examiner—Benjamin W. Wyche
Attorney—Low and Berman

ABSTRACT: A double-plate friction clutch in which the axial movement of the spring-loaded intermediate driving plate away from the flywheel is limited by an improved mechanism. An abutment member is axially slidably mounted on the intermediate disc in axial alignment with two abutments on the flywheel which are oppositely offset from the abutment member. A friction brake on the intermediate disc prevents axial shifting of the abutment member under the pressure of the relatively weak springs pushing the intermediate plate away from the flywheel, but cannot prevent shifting of the abutment member by the more powerful pressure plate springs so that the position of the abutment member on the intermediate disc is adjusted during each clutch adjustment for wear of the friction facing on the driven disc on the flywheel side.

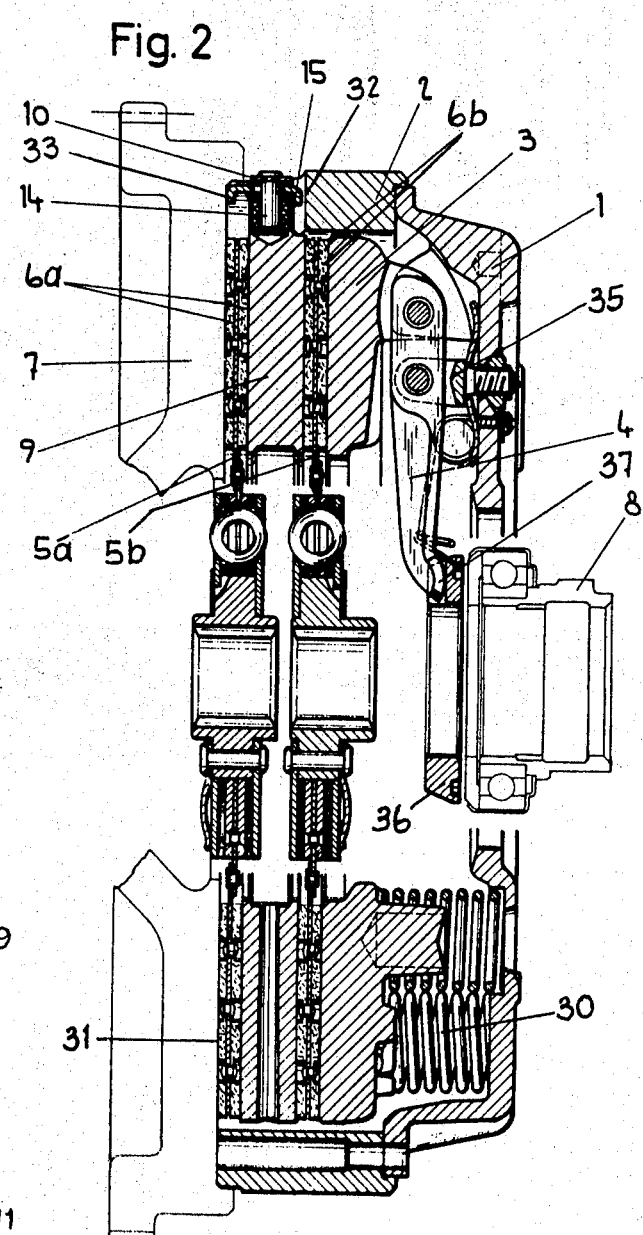
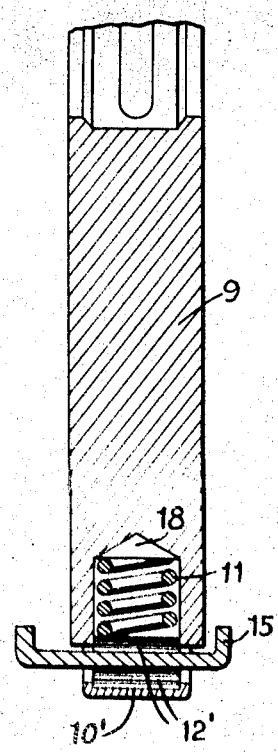
Fig. 2
Fig. 7

PATENTED FEB 9 1971

INVENTOR
Richard Binder
By: Low and Berman
AGENTS

PATENTED FEB 9 1971
3,561,577
SHEET 4 OF 4
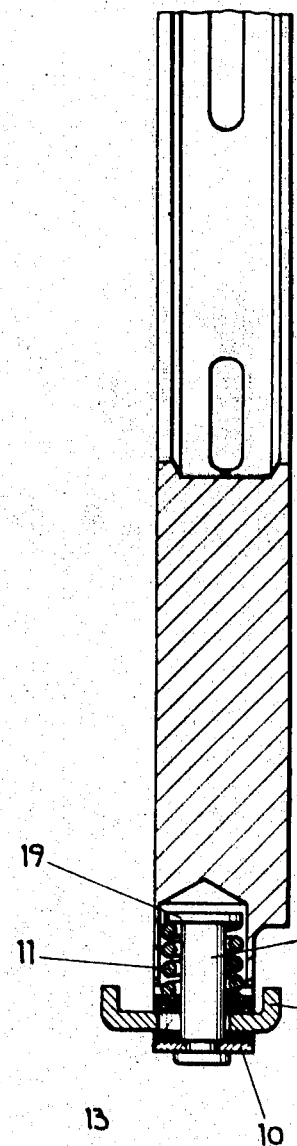
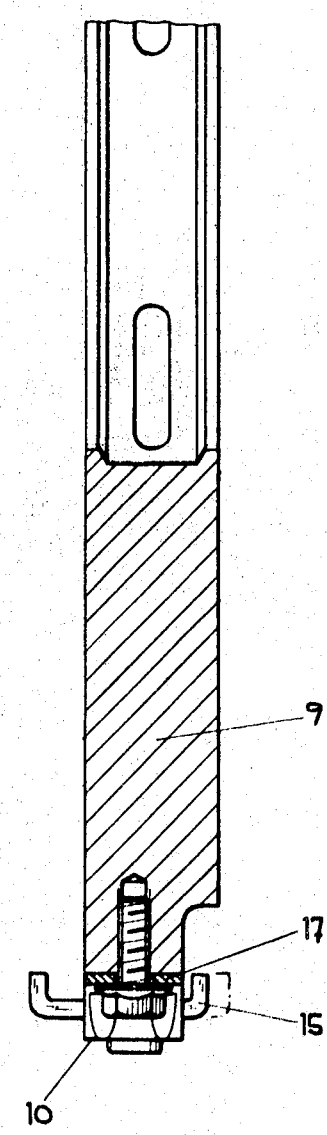
Fig. 5
Fig. 6
INVENTOR
Richard Binder

MULTIPLE DISC CLUTCH WITH AUTOMATIC WEAR ADJUSTER

This invention relates to friction clutches for motor vehicles and the like, and particularly to an improvement in a double-plate friction clutch of a basically known type in which an intermediate driving plate is axially arranged between the pressure plate and the flywheel, and the two driven discs are respectively arranged on opposite sides of the intermediate plate.

It is common practice in such clutches to provide springs, much weaker than the pressure plate springs, which bias the intermediate plate axially away from the flywheel, and abutments which limit the distance over which the intermediate plate can be moved by the biasing springs.

The primary object of the instant invention is an improvement in the limiting mechanism which automatically adjusts the range of movement of the intermediate plate as the friction facings on the driven disc on the flywheel side of the intermediate plate are worn, thereby providing more uniform wear of all friction facings, and more reliable operation of the clutch.

It is another object of the invention to provide a double-plate clutch, which is relatively simple in its structure, and accordingly low in first cost, and which can be serviced easily.

With these and other objects in view, the invention provides an abutment member mounted on the intermediate driven plate for axial movement relative thereto, and two abutments fixed on the flywheel in axial alignment with the abutment member and offset from the same in opposite axial directions, and a friction brake on the intermediate plate which impedes axial movement of the abutment members with a force sufficient to overcome the force of the spring or springs which bias the intermediate plate away from the flywheel, but not sufficient for preventing axial movement of the abutment member by engagement with one of the aligned abutments under the force of the pressure plate spring or springs.

The exact nature of this invention, as well as other features and objects of the same will be readily apparent from consideration of the following specification relating to the annexed drawing in which:

FIG. 2 illustrates the clutch of FIG. 1 in section on two angularly offset radii, as is conventional;

FIGS. 5 and 6 are views of the device of FIG. 4 taken on the lines V—V and VI—VI respectively; and FIG. 7 shows a modification of the device of FIG. 4 in a view corresponding to that of FIG. 5.

Figure 1:
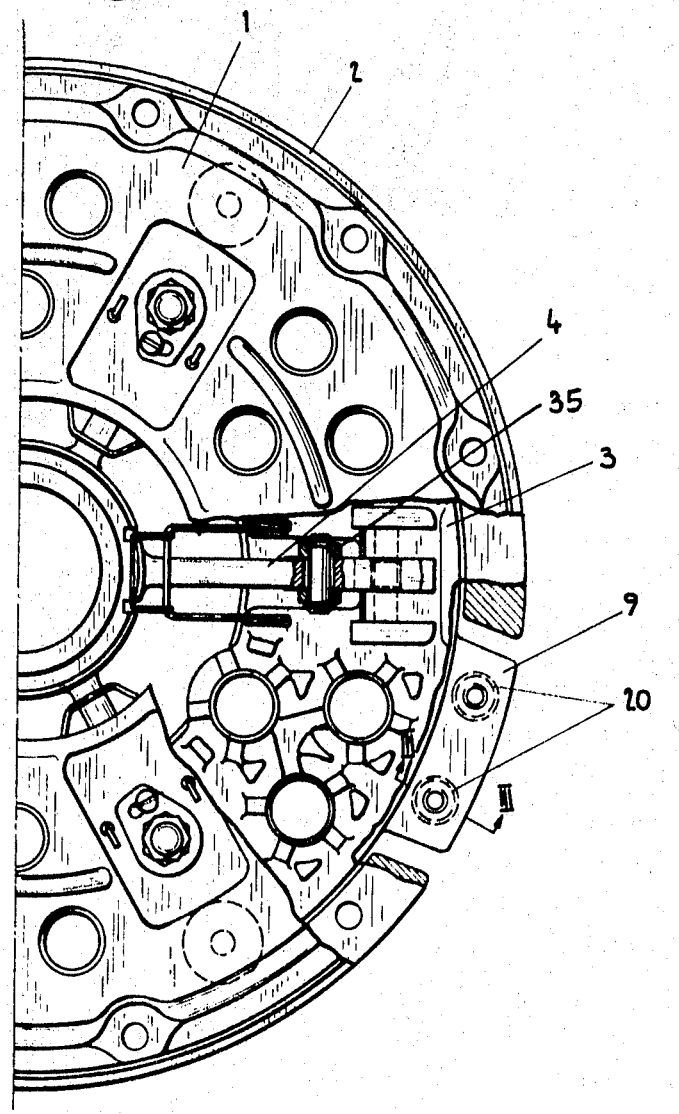
FIG. 1 shows one half of a clutch of the invention in front elevation, the nonillustrated half being practically a mirror image of what is seen in FIG. 1.

Referring now to the drawing in more detail, and initially to FIGS. 1 and 2, there is seen a double-plate automotive friction clutch of a basic type which is well known.

A clutch housing pan 1 and a fixedly attached, generally cylindrical ring 2 form the housing of the illustrated clutch. A driving pressure plate 3 is mounted on the clutch housing by means of clutch release levers 4 secured to the pan 1 by pivot assemblies 35.

The pressure plate 3 and a driven disc 5b carrying friction facings 6b are frictionally engaged by pressure plate springs 30 in the illustrated operative position of the clutch, while another driven disc 5a carrying friction facings 6a is simultaneously held against the radial contact face 31 of a flywheel 7 by an intermediate driving plate 9 arranged between the two discs 5a, 5b. The clutch housing 1, 2 is fixedly fastened to the flywheel 7, and the intermediate plate 9 is secured to the driving elements 1, 2, 7 for joint rotation, in a conventional manner not evident from FIGS. 1 and 2, but is capable of axial movement. The discs 5a, 5b are normally splined to the clutch output shaft, not shown, and capable of axial movement on the shaft. The flywheel is driven by the nonillustrated crankshaft of the associated engine.

Figure 3:
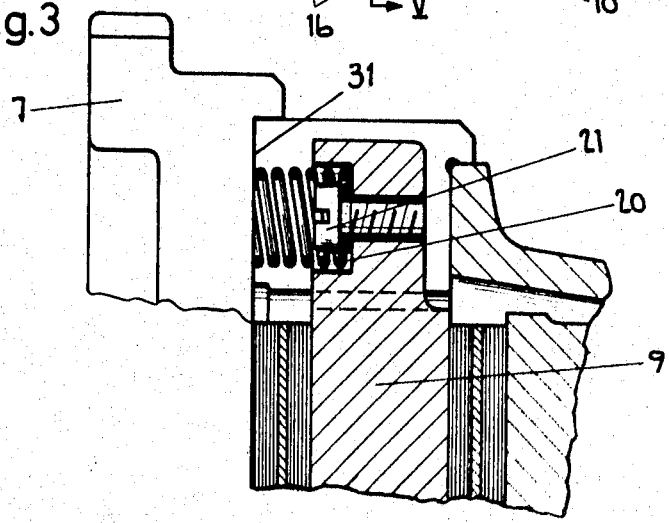
FIG. 3 shows a detail of the apparatus of FIG. 1 in enlarged section of the line III—III.

The clutch is disengaged by a clutch release bearing 8 carrying a ring 36 which engages the free ends 37 of the levers 4 for pivoting the same on the clutch housing pan 1, and for thereby lifting the pressure plate 3 from the disc 5b. Relatively weak, helical compression springs 20 indicated in FIG. 1, but better seen in FIG. 3 are fastened peripherally to the intermediate plate 9 in recesses of the ring 2 by bolts 21, and abut against the radial contact face 31 of the flywheel 7. They bias the plate 9 axially away from the flywheel 7 when the pressure of the powerful pressure plate springs 30 is relieved by the clutch release mechanism.

The clutch structure described so far is entirely conventional, and its operation is too well known to require description. This invention is more specifically concerned with a device which limits the movement of the plate 9 away from the flywheel 7 under the urging of the springs 20. Only one such device is seen in a recess of the ring 2 in FIG. 2, but it will be understood that the illustrated device is at least duplicated once at the opposite end of a clutch diameter, as are conventional elements of the clutch structure referred to in the plural in the preceding description, but represented in the drawing by a single element. The sole illustrated limiting device will be described hereinbelow, and the structure and arrangement of its twin will be obvious.

Figure 4:
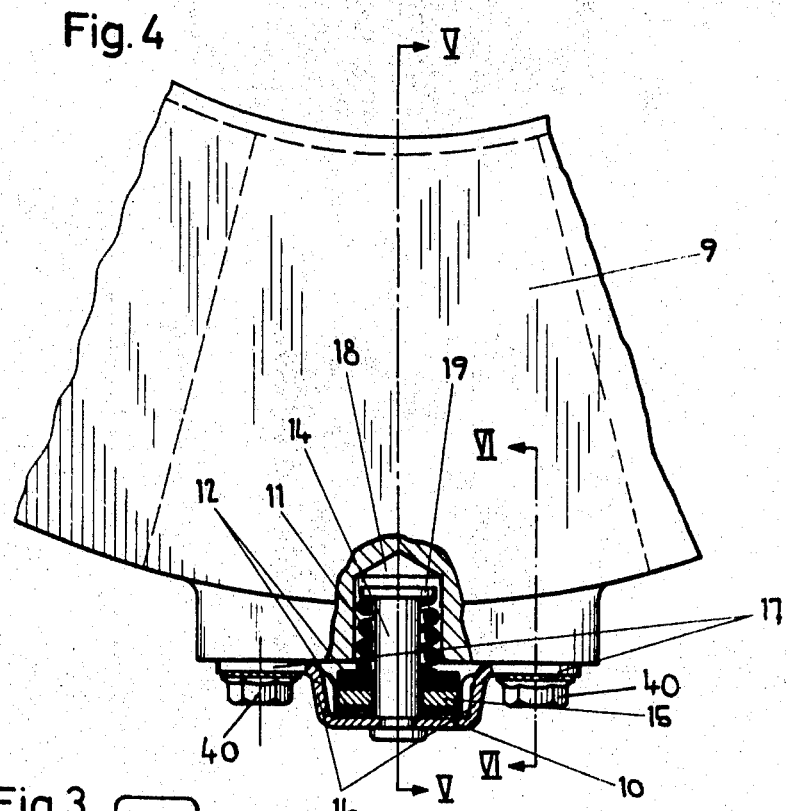
FIG. 4 shows a portion of the apparatus of FIG. 2 on a much larger scale.

As is partly shown in FIG. 2, but better seen in FIG. 4, the limiting device includes a sheet metal strap 10 whose two ends 17 extend practically in a common plane and are fastened to a circumferential face of the driving intermediate plate 9 by radial screws 40. The central portion of the strap 10 is approximately U-shaped. The bight part of the U-shape is offset radially outwardly from the attached strap ends 17 and carries a fixedly fastened pin 14 which projects into a blind, radial bore 18 in the plate 9.

A helical compression spring 11 abuts against a collar 19 on the inner end of the pin 14 and holds a stack consisting of two square friction washers 12 and an abutment bar 15 between the washers 12 against the bight part of the strap 10 between the two leg parts 16 of the central strap portion which laterally guide the bar 15.

The shape of the abutment bar 15 is better seen in FIGS. 2, 5, and 6. It is a stiff flat piece of hardened steel whose ends are offset at right angles for abutting engagement with respective, axially aligned abutment faces 32, 33 of the fixedly connected ring 2 and flywheel 7. A longitudinal slot 13 in the bar 15 is dimensioned to receive the pin 14 with sufficient clearance to permit longitudinal movement of the bar on the pin, but such movement is impeded by the washers 12, made of the same material as the friction facings 6a, 6b, under the pressure of the spring 11. The washers 12 and spring 11, in effect, constitute a friction brake on the plate 9 which is applied to the bar 15.

As is best seen in FIG. 2, the length of the bar 15, as measured between the abutment faces 32, 33 is slightly smaller than the spacing of the abutment faces, and the intermediate plate 9 can move away from the flywheel 7 only until the bar 15 hits the abutment face 32 on the ring 2, when the clutch is disengaged by the release bearing 8. The friction facing 6a on the disc 5a is lifted sufficiently from the contact face 31 of the flywheel to avoid wear of the friction facing 6a during relative rotation of the disc 5a and the flywheel 7, which is normally rotated continuously by the nonillustrated engine.

When the clutch pedal (not shown) which is connected to the clutch release bearing 8 is released by the driver, and the pressure plate springs 30 engage the clutch, the intermediate plate 9 returns to the illustrated position in which the bar 15 just touches the abutment face 33 of the flywheel 7. As the facing 6a on the driven disc 5a on the flywheel side of the plate 9 is gradually worn away, the bar 15 is shifted between the friction washers 12 toward the right, as viewed in FIG. 2, by the force of the pressure plate springs 30 which is transmitted to the intermediate plate 9 and shifts the plate toward the left in FIG. 2 until the friction facing 5a fully engages the contact face 31.

The helical compression spring 11 of the friction brake is chosen in such a manner that the braking force is sufficient for overcoming the force of the relatively weak biasing springs 20, but not sufficient for preventing the axial movement of the bar 15 on the plate 9 by engagement of the bar with the abutment face 33 under the force of the pressure plate springs 30. The limiting mechanism thus automatically maintains the desired distance between the friction facing 5a and the contact face 31 in the disengaged condition of the clutch, the distance being precisely determined by the length of the bar 15 and the spacing of the faces 32, 33 regardless of the wear of the friction facing. Yet, the mechanism does not interfere in the least with full engagement of the clutch.

The force with which the friction brake holds the abutment bar 15 can be adjusted in steps by replacing the spring 11 by a stronger or weaker spring. Fine adjustment of the brake is available in a simple manner by inserting washers between the spring 11 and the collar 19. Obviously, the pin 14, which is fixedly fastened to the strap 10, may be replaced with a stud threadedly engaging the strap 10, but otherwise identical with the pin 14. A screwdriver may then be engaged with a slot in the outwardly directed end face of the stud to adjust the tension of the spring 11 in the same manner as is achieved by turning the screws 40 in the device illustrated in FIGS. 2 and 4 to 6. Such adjustments are readily made without removing the clutch from a car in which it may be installed or without disassembling the clutch if it is to be adjusted prior to its installation. It can be made in the limiting mechanism before it is installed in the clutch. The adjusted condition of the brake is thereafter fixed. If the clutch is supplied without the flywheel 7 which constitutes a second, fixed pressure plate opposite the movable pressure plate 3 the clutch can be installed without establishing any connection between the limiting mechanism and the flywheel.

The actual braking force required for the desired automatic shifting of the bar 15 is very small, typically equal to less than twice the force of gravity on the bar, the springs 20 can be made correspondingly weak, and the contact pressure between the disc 5a and the contact face 31 is practically the same as that between the disc 5b and the pressure plate. In an actual embodiment of the invention, the difference in the contact pressures has been found to be only 2 percent, and the wear of the friction facings 6a, 6b was correspondingly equal.

The limiting mechanism of the invention is normally installed as a unit on the intermediate plat plate by means of the screws 40. It may therefore be tested for its braking force, and the necessary adjustments made in a very simple manner before the unit is installed. In the installed condition, the unit does not significantly increase the space occupied by the other elements of the clutch because the unit is largely received in the bore 18.

A simpler version of the limiting mechanism of the invention is illustrated in FIG. 7. The intermediate plate 9 is provided with a blind radial bore 18, as described above, and an abutment bar 15 having offset ends is held by a strap 10' between two round friction washers 12'. The dimensions of the strap 10' and of the washers 12' are such that one of the washers is held between raised rims of the strap by the bar 15, and the other washer 12' is at least partly received in the bore 18 in all operative positions of the device, and is biased outward of the bore by the helical compression spring 11 which abuts against the bottom of the bore 18, and whose force, together with the frictional properties of the washers 12', determines the breaking effect of the device.

The mechanism shown in FIG. 7 is even simpler and less costly than that illustrated in FIGS. 2 and 4 to 6, and its braking force may be adjusted by tightening and loosening the screws 40, not visible in FIG. 7 which hold the strap 10' to the plate 9 in a manner obvious from FIG. 4. The mechanism of FIG. 7 however, is assembled only on the plate 9, and cannot be tested prior to assembly in the simple manner available with the first-described embodiment.

I claim:

1. In a friction clutch for a motor vehicle and the like, the clutch having an axis, two axially spaced driving pressure members (3,7) connected for joint rotation about said axis; an intermediate plate member (9) axially movable between said pressure members and secured to the same for rotation with the same; two driven friction discs (5a, 5b) axially movably interposed between said pressure members respectively and said plate member; first yieldably resilient means (30) biasing one of said pressure members (3) toward the other pressure member (7) for simultaneous frictional engagement of said discs with the respective pressure members and with said plate member; clutch-releasing means 4, 8 for moving said one pressure member away from the other pressure member against the restraint of said yieldably resilient means; second yieldably resilient means (20) biasing said plate member away from said other pressure member with a force smaller than the force of said first yieldably resilient means; and limiting means for limiting the axial movement of said plate member; the improvement in said limiting means which comprises:

a. an abutment member (15) mounted on said plate member (9) for axial movement relative thereto;

b. two abutment means (32,33) fixed on said other pressure member (7) in axial alignment with said abutment member and offset from the same in opposite axial directions; and c. friction means 11, 12 on said plate member, engaging said abutment member with a frictional force sufficient for overcoming the force of said second yieldably resilient means (20), but not sufficient for preventing said axial movement of the abutment member by engagement with one of said abutment means (33) under the force of said first yieldably resilient means (30).

2. In a clutch as set forth in claim 1, said abutment member having two axially spaced abutment faces respectively opposite said abutment means, and the axil axial spacing of said abutment faces being smaller than the axial spacing of said two abutment means.

3. In a clutch as set forth in claim 2, said abutment member being axially elongated, and said abutment faces thereof being longitudinally spaced.

4. In a clutch as set forth in claim 1, mounting means securing said abutment member to a circumferential face of said plate member, said friction means including two elements of high friction material, said abutment member being radially interposed between said two elements, and third yieldably resilient means urging said elements into frictional engagement with said abutment member.

5. In a clutch as set forth in claim 4, said mounting means including a strap member releasably fastened to said plate member, a pin member mounted on said strap member and being received in an axially elongated opening of said abutment member, said third yieldably resilient means including a spring member abutting against said pin member.

6. In a clutch as set forth in claim 5, said strap member being U-shaped, the bight of said U-shape receiving said abutment member in guiding engagement.

7. In a clutch as set forth in claim 5, said plate member being formed with a radial bore, said pin member and said spring member being partly received in said bore.

8. In a clutch as set forth in claim 4, adjusting means for adjusting the urging force of said third yieldably resilient means.

9. In a clutch as set forth in claim 1, mounting means securing said abutment member to a circumferential face of said plate member.

10. In a clutch as set forth in claim 9, said mounting means releasably securing said abutment member to said circumferential face.